United States Patent
Oda et al.

(10) Patent No.: US 11,914,397 B2
(45) Date of Patent: Feb. 27, 2024

(54) ROBOT CONTROL SYSTEM, ROBOT CONTROL METHOD, AND PROGRAM

(71) Applicant: TOYOTA JIDOSHA KABUSHIKI KAISHA, Toyota (JP)

(72) Inventors: Shiro Oda, Anjo (JP); Tetsuya Taira, Nagakute (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Toyota (JP); Kyosuke Arai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 17/545,390

(22) Filed: Dec. 8, 2021

(65) Prior Publication Data
US 2022/0253072 A1     Aug. 11, 2022

(30) Foreign Application Priority Data
Feb. 8, 2021   (JP) .................. 2021-018577

(51) Int. Cl.
*G05D 1/00*     (2006.01)
*B25J 9/16*     (2006.01)

(52) U.S. Cl.
CPC .......... *G05D 1/0287* (2013.01); *B25J 9/1666* (2013.01); *G05D 2201/0206* (2013.01)

(58) Field of Classification Search
CPC .. G05D 1/0027; G05D 1/0088; G05D 1/0223; G05D 1/0225; G05D 1/0229; G05D 1/0287; G05D 1/0289; G05D 1/0291; G05D 1/0295; G05D 2201/02; G05D 2201/0206; G05D 2201/0211; G05D 2201/0216
See application file for complete search history.

(56) References Cited

FOREIGN PATENT DOCUMENTS

| JP | 2006113687 A | * | 4/2006 |
| JP | 2006113687 A | | 4/2006 |

(Continued)

OTHER PUBLICATIONS

A. Souto et al., "Fleet Management System for Autonomous Mobile Robots in Secure Shop-floor Environments," 2021 IEEE 30th International Symposium on Industrial Electronics (ISIE), Kyoto, Japan, 2021, pp. 1-6, doi: 10.1109/ISIE45552.2021.9576269. (Year: 2021).*

*Primary Examiner* — Khoi H Tran
*Assistant Examiner* — Bryant Tang
(74) *Attorney, Agent, or Firm* — Dickinson Wright, PLLC

(57) ABSTRACT

A robot control system according to the present embodiment is a robot control system that controls a plurality of mobile robots that can autonomously move in a facility. The robot control system acquires error information indicating that an error has occurred in a first transport robot, acquires transported object information related to a transported object of the first transport robot, determines a second transport robot able to transport the transported object of the first transport robot among the transport robots based on the transported object information and the error information, and moves the second transport robot to a transfer location of the transported object of the first transport robot.

18 Claims, 11 Drawing Sheets

(56) References Cited

FOREIGN PATENT DOCUMENTS

| | | | | |
|---|---|---|---|---|
| JP | 2019109769 A | 7/2019 | | |
| WO | 2018/124389 A1 | 7/2018 | | |
| WO | WO-2018124389 A1 * | 7/2018 | ............ | B60W 30/08 |

* cited by examiner

ROBOT CONTROL SYSTEM, ROBOT CONTROL METHOD, AND PROGRAM

CROSS-REFERENCE TO RELATED APPLICATION

This application claims priority to Japanese Patent Application No. 2021-018577 filed on Feb. 8, 2021, incorporated herein by reference in its entirety.

BACKGROUND

1. Technical Field

The present disclosure relates to a robot control system, a robot control method, and a program.

2. Description of Related Art

Japanese Unexamined Patent Application Publication No. 2019-109769 (JP 2019-109769 A) discloses a moving body that detects an obstacle using a distance measuring sensor. A movement control unit controls the moving body so as to prevent a collision with the detected obstacle. An obstacle detection control unit weakens the detection of obstacles when a predetermined condition is satisfied. For example, the obstacle detection control unit narrows the detection range of the obstacle or stops detecting the obstacle when the predetermined condition is satisfied. Predetermined conditions include that the current position is a predetermined location, that a sign is detected, or that the moving body is in the elevator car.

SUMMARY

When controlling a plurality of moving bodies (also referred to as mobile robots), there is a demand for more efficient movement of the moving bodies.

The present disclosure has been made to solve such an issue, and provides a robot control system, a robot control method, and a program capable of controlling the mobile robot more efficiently.

A robot control system according to the present embodiment is a robot control system that controls a plurality of mobile robots that autonomously moves in a facility, such that a distance from a peripheral object does not fall below a threshold distance. The robot control system acquires information on a standby area set in map information of the facility, and changes the threshold distance in accordance with the number of the mobile robots standing by in the standby area.

In the above-described robot control system, the robot control system may reduce the threshold distance when the number of the mobile robots stopped in the standby area exceeds a predetermined value.

In the above-described robot control system, the robot control system may reduce the threshold distance in accordance with the number of the mobile robots standing by in the standby area and the expected arrival number of the mobile robots moving toward the standby area.

In the above-described robot control system, when the threshold distance is reduced, a mobile robot may approach another mobile robot on one end side of the standby area.

In the above-described robot control system, the mobile robot may be a transport robot that transports a transported object, and the robot control system may change the threshold distance in accordance with transported object information on the transported object transported by the mobile robot.

In the above-described robot control system, while the mobile robot is moving, the threshold distance may change stepwise in accordance with a moving speed.

In the above-described robot control system, a size of the standby area may be fixed.

A robot control method according to the present embodiment is a robot control method that controls a plurality of mobile robots that autonomously moves in a facility, such that a distance from a peripheral object does not fall below a threshold distance. The robot control method includes: acquiring information on a standby area set in map information of the facility; and changing the threshold distance in accordance with the number of the mobile robots standing by in the standby area.

The above-described robot control method may further include reducing the threshold distance when the number of the mobile robots stopped in the standby area exceeds a predetermined value.

The above-described robot control method may further include reducing the threshold distance in accordance with the number of the mobile robots standing by in the standby area and the expected arrival number of the mobile robots moving toward the standby area.

In the above-described robot control method, when the threshold distance is reduced, a mobile robot may approach another mobile robot on one end side of the standby area.

In the above-described robot control method, the mobile robot may be a transport robot that transports a transported object, and the robot control method may change the threshold distance in accordance with transported object information on the transported object transported by the mobile robot.

In the above-described robot control method, while the mobile robot is moving, the threshold distance may change stepwise in accordance with a moving speed.

In the above-described robot control method, a size of the standby area may be fixed.

A program according to the present embodiment is a program that causes a computer to execute a robot control method that controls a plurality of mobile robots that autonomously moves in a facility, such that a distance from a peripheral object does not fall below a threshold distance. The robot control method includes: acquiring information on a standby area set in map information of the facility; and changing the threshold distance in accordance with the number of the mobile robots standing by in the standby area.

In the above-described program, the program may reduce the threshold distance when the number of the mobile robots stopped in the standby area exceeds a predetermined value.

In the above-described program, the program may reduce the threshold distance in accordance with the number of the mobile robots standing by in the standby area and the expected arrival number of the mobile robots moving toward the standby area.

In the above-described program, when the threshold distance is reduced, a mobile robot may approach another mobile robot on one end side of the standby area.

In the above-described program, the mobile robot may be a transport robot that transports a transported object, and the program may change the threshold distance in accordance with transported object information on the transported object transported by the mobile robot.

In the above-described program, while the mobile robot is moving, the threshold distance may change stepwise in accordance with a moving speed.

In the above-described program, a size of the standby area may be fixed.

The present disclosure can provide a robot control system, a robot control method, and a program capable of appropriately controlling the transport robot.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present disclosure will be described through embodiments of the disclosure, but the disclosure according to the scope of the claims is not limited to the following embodiments. Moreover, not all of the configurations described in the embodiments are indispensable as means for solving the problem.

Schematic Configuration

Figure 1:
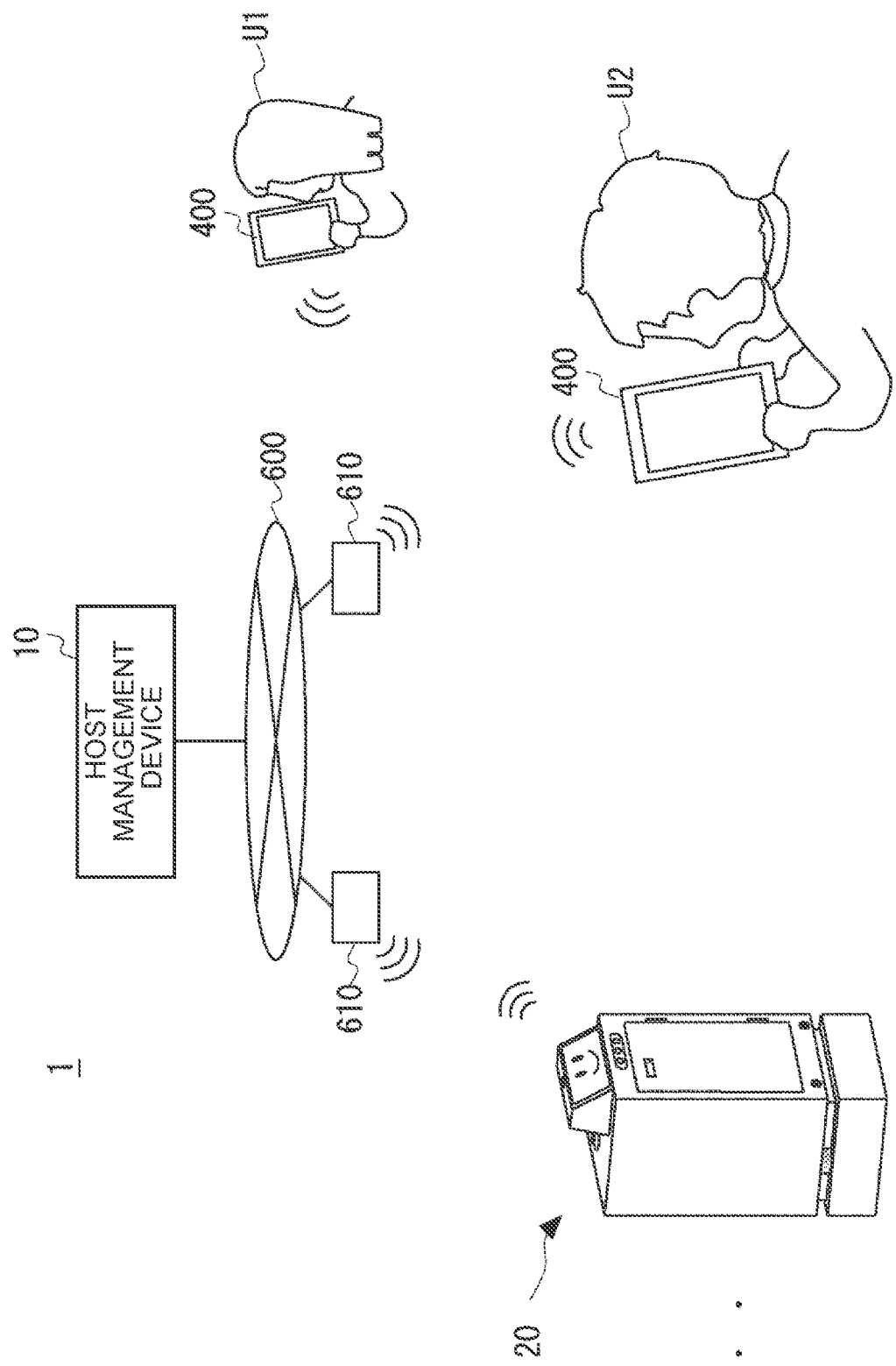
FIG. 1 is a conceptual diagram illustrating an overall configuration of a system in which a mobile robot according to the present embodiment is used.

FIG. 1 is a conceptual diagram illustrating an overall configuration of a system 1 in which a mobile robot 20 according to the present embodiment is used. For example, the mobile robot 20 is a transport robot that executes transport of a transported object as a task. The mobile robot 20 autonomously travels in order to transport a transported object in a medical welfare facility such as a hospital, a rehabilitation center, a nursing facility, and an elderly care facility. The system according to the present embodiment can also be used in a commercial facility such as a shopping mall.

A user U1 stores the transported object in the mobile robot 20 and requests the transport. The mobile robot 20 autonomously moves to the set destination to transport the transported object. That is, the mobile robot 20 executes a luggage transport task (hereinafter also simply referred to as a task). In the following description, the location where the transported object is loaded is referred to as a transport source, and the location where the transported object is delivered is referred to as a transport destination.

For example, it is assumed that the mobile robot 20 moves in a general hospital having a plurality of clinical departments. The mobile robot 20 transports equipment, consumables, medical equipment, and the like between the clinical departments. For example, the mobile robot 20 delivers the transported object from a nurse station of one clinical department to a nurse station of another clinical department. Alternatively, the mobile robot 20 delivers the transported object from the storage of the equipment and the medical equipment to the nurse station of the clinical department. The mobile robot 20 also delivers medicine dispensed in the dispensing department to the clinical department or a patient that is scheduled to use the medicine.

Examples of the transported object include medicines, consumables such as bandages, specimens, testing instruments, medical equipment, hospital food, and equipment such as stationery. The medical equipment includes sphygmomanometers, blood transfusion pumps, syringe pumps, foot pumps, nurse call buttons, bed leaving sensors, low-pressure continuous inhalers, electrocardiogram monitors, drug injection controllers, enteral nutrition pumps, artificial respirators, cuff pressure gauges, touch sensors, aspirators, nebulizers, pulse oximeters, artificial resuscitators, aseptic devices, echo machines, and the like. Meals such as hospital food and inspection meals may also be transported. Further, the mobile robot 20 may transport used equipment, tableware that have been used during meals, and the like. When the transport destination is on a different floor, the mobile robot 20 may move using an elevator or the like.

The system 1 includes the mobile robot 20, a host management device 10, a network 600, a communication unit 610, and a user terminal 400. The user U1 or a user U2 can make a transport request for the transported object using the user terminal 400. For example, the user terminal 400 is a tablet computer, a smartphone, or the like. The user terminal 400 only needs to be an information processing device capable of wireless or wired communication.

In the present embodiment, the mobile robot 20 and the user terminal 400 are connected to the host management device 10 via the network 600. The mobile robot 20 and the user terminal 400 are connected to the network 600 via the communication unit 610. The network 600 is a wired or wireless local area network (LAN) or wide area network (WAN). The host management device 10 is connected to the network 600 by wire or wirelessly. The communication unit 610 is, for example, a wireless LAN unit installed in each environment. The communication unit 610 may be a general-purpose communication device such as a WiFi router.

Various signals transmitted from the user terminals 400 of the users U1 and U2 are once sent to the host management device 10 via the network 600, and transmitted from the host management device 10 to the target mobile robots 20. Similarly, various signals transmitted from the mobile robot 20 are once sent to the host management device 10 via the network 600, and transmitted from the host management device 10 to the target user terminal 400. The host management device 10 is a server connected to each equipment, and collects data from each equipment. The host management device 10 is not limited to a physically single device, and may have a plurality of devices that performs distributed processing. Further, the host management device 10 may be distributedly provided in edge devices such as the mobile robot 20. For example, a part or all of the system 1 may be installed in the mobile robot 20.

The user terminal 400 and the mobile robot 20 may transmit and receive signals without passing through the host management device 10. For example, the user terminal 400 and the mobile robot 20 may directly transmit and receive signals by wireless communication. Alternatively, the user terminal 400 and the mobile robot 20 may transmit and receive signals via the communication unit 610.

The user U1 or the user U2 requests the transport of the transported object using the user terminal 400. Hereinafter, description is made assuming that the user U1 is the transport requester at the transport source and the user U2 is the planned recipient at the transport destination (destination). Needless to say, the user U2 at the transport destination can also make a transport request. Further, a user who is located at a location other than the transport source or the transport destination may make a transport request.

When the user U1 makes a transport request, the user U1 inputs, using the user terminal 400, the content of the transported object, the receiving point of the transported object (hereinafter also referred to as the transport source), the delivery destination of the transported object (hereinafter also referred to as the transport destination), the estimated arrival time at the transport source (the receiving time of the transported object), the estimated arrival time at the transport destination (the transport deadline), and the like. Hereinafter, these types of information are also referred to as transport request information. The user U1 can input the transport request information by operating the touch panel of the user terminal 400. The transport source may be a location where the user U1 is present, a storage location for the transported object, or the like. The transport destination is a location where the user U2 or a patient who is scheduled to use the transported object is present.

The user terminal 400 transmits the transport request information input by the user U1 to the host management device 10. The host management device 10 is a management system that manages a plurality of mobile robots 20. The host management device 10 transmits an operation command for executing a transport task to the mobile robot 20. The host management device 10 determines the mobile robot 20 that executes the transport task for each transport request. Then, the host management device 10 transmits a control signal including an operation command to the mobile robot 20. The mobile robot 20 moves from the transport source so as to arrive at the transport destination in accordance with the operation command.

For example, the host management device 10 assigns a transport task to the mobile robot 20 at or near the transport source. Alternatively, the host management device 10 assigns a transport task to the mobile robot 20 heading toward the transport source or its vicinity. The mobile robot 20 to which the task is assigned goes to the transport source to pick up the transported object. The transport source is, for example, a location where the user U1 who has requested the task is present.

When the mobile robot 20 arrives at the transport source, the user U1 or another staff member loads the transported object on the mobile robot 20. The mobile robot 20 on which the transported object is loaded autonomously moves with the transport destination set as the destination. The host management device 10 transmits a signal to the user terminal 400 of the user U2 at the transport destination. Thus, the user U2 can know that the transported object is being transported and the estimated arrival time. When the mobile robot 20 arrives at the set transport destination, the user U2 can receive the transported object stored in the mobile robot 20. As described above, the mobile robot 20 executes the transport task.

In the overall configuration described above, each element of the control system can be distributed to the mobile robot 20, the user terminal 400, and the host management device 10 to construct the control system as a whole. Further, it is possible to collect substantial elements for realizing the transport of the transported object in a single device to construct the transport system. The host management device 10 controls one or more mobile robots 20.

Control Block Diagram

Figure 2:
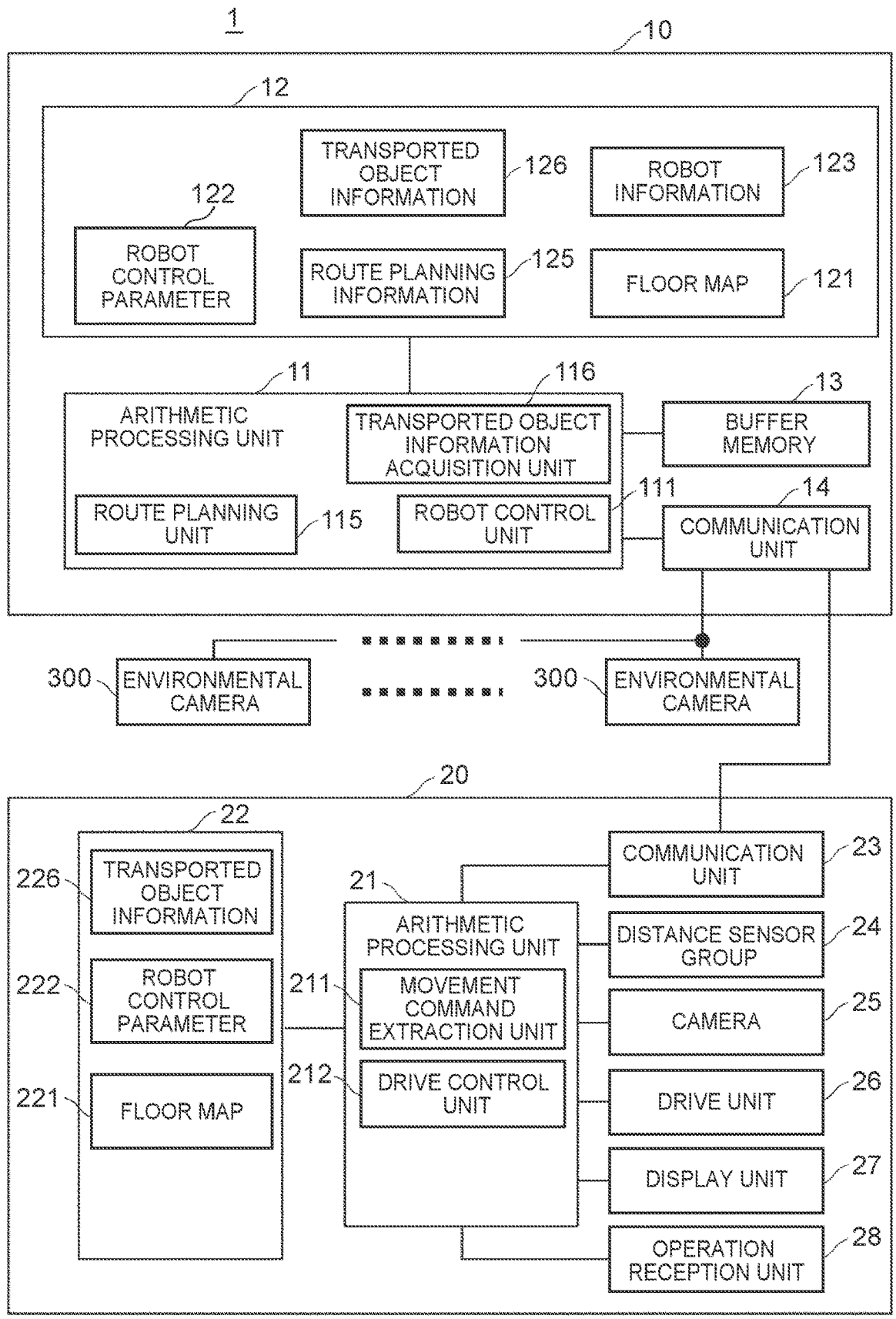
FIG. 2 is a control block diagram of a control system according to the present embodiment.

FIG. 2 shows a control block diagram showing a control system of the system 1. As shown in FIG. 2, the system 1 includes the host management device 10, the mobile robot 20, and environmental cameras 300.

The system 1 efficiently controls a plurality of mobile robots 20 while causing the mobile robots 20 to autonomously move in a predetermined facility. Therefore, a plurality of environmental cameras 300 is installed in the facility. For example, the environmental cameras 300 are each installed in a passage, a hallway, an elevator, an entrance/exit, etc. in the facility.

The environmental cameras 300 acquire images of ranges in which the mobile robot 20 moves. In the system 1, the host management device 10 collects the images acquired by the environmental cameras 300 and the information based on the images. Alternatively, the images or the like acquired by the environmental cameras 300 may be directly transmitted to the mobile robots. The environmental cameras 300 may be surveillance cameras or the like provided in a passage or an entrance/exit in the facility. The environmental cameras 300 may be used to determine the distribution of congestion status in the facility.

In the system 1 according to a first embodiment, the host management device 10 plans a route based on the transport request information. The host management device 10 instructs a destination for each mobile robot 20 based on route planning information created by the host management device 10. Then, the mobile robot 20 autonomously moves toward the destination designated by the host management device 10. The mobile robot 20 autonomously moves toward the destination using sensors, floor maps, position information, and the like provided in the mobile robot 20 itself.

For example, the mobile robot 20 travels so as not to come into contact with surrounding equipment, objects, walls, and people (hereinafter collectively referred to as peripheral objects). Specifically, the mobile robot 20 detects the distance from the peripheral object and travels while keeping a distance from the peripheral object by a certain distance (defined as a threshold distance) or more. When the distance from the peripheral object becomes equal to or less than the threshold distance, the mobile robot 20 decelerates or stops. With this configuration, the mobile robot 20 can travel without coming into contact with peripheral objects. Since contact can be avoided, safe and efficient transport is possible. The threshold distance is a predetermined distance set so that each mobile robot can travel safely.

The host management device 10 includes an arithmetic processing unit 11, a storage unit 12, a buffer memory 13, and a communication unit 14. The arithmetic processing unit 11 performs arithmetic for controlling and managing the mobile robot 20. The arithmetic processing unit 11 can be implemented as a device capable of executing a program such as a central processing unit (CPU) of a computer, for example. Various functions can also be realized by a program. Only a robot control unit 111, a route planning unit 115, and a transported object information acquisition unit 116 that are characteristics of the arithmetic processing unit 11 are shown in FIG. 2, but other processing blocks can also be provided.

The robot control unit 111 performs arithmetic for remotely controlling the mobile robot 20 and generates a control signal. The robot control unit 111 generates a control signal based on route planning information 125 and the like, which will be described later. Further, the robot control unit 111 generates a control signal based on various types of information obtained from the environmental cameras 300 and the mobile robots 20. The control signal may include update information such as a floor map 121, robot information 123, and a robot control parameter 122, which will be described later. That is, when various types of information are updated, the robot control unit 111 generates a control signal in accordance with the updated information.

The transported object information acquisition unit 116 acquires information on the transported object. The transported object information acquisition unit 116 acquires information on the content (type) of the transported object that is being transported by the mobile robot 20.

The route planning unit 115 plans the route for each mobile robot 20. When the transport task is input, the route planning unit 115 plans the route for transporting the transported object to the transport destination (destination) based on the transport request information. Specifically, the route planning unit 115 refers to the route planning information 125, the robot information 123, and the like already stored in the storage unit 12 to determine the mobile robot 20 that executes a new transport task. The starting point is the current position of the mobile robot 20, the transport destination of the immediately preceding transport task, the receiving point of the transported object, or the like. The destination is the transport destination of the transported object, a standby location (standby area), a charging location, or the like.

Here, the route planning unit 115 sets passing points from the starting point to the destination of the mobile robot 20. The route planning unit 115 sets the passing order of the passing points for each mobile robot 20. The passing points are set, for example, at branch points, intersections, lobbies in front of elevators, and their surroundings. In a narrow passage, it may be difficult for the mobile robots 20 to pass each other. In such a case, the passing point may be set at a location before the narrow passage. Candidates for the passing points may be registered in the floor map 121 in advance.

The route planning unit 115 determines the mobile robot 20 that performs each transport task from among the plurality of mobile robots 20 such that the tasks can be efficiently executed as the whole system. The route planning unit 115 preferentially assigns the transport task to the mobile robot 20 at standby or the mobile robot 20 located near the transport source.

The route planning unit 115 sets the passing points including a starting point and a destination for the mobile robot 20 to which the transport task is assigned. For example, when there are two or more movement routes from the transport source to the transport destination, the passing points are set such that the movement can be performed in a shorter time. Thus, the host management device 10 updates the information indicating the congestion status of the passages based on the images of the camera or the like. Specifically, locations where other mobile robots 20 are passing and locations with many people have a high degree of congestion. Therefore, the route planning unit 115 sets the passing points so as to avoid locations with a high degree of congestion.

The mobile robot 20 may be able to move to the destination by either a counterclockwise movement route or a clockwise movement route. In such a case, the route planning unit 115 sets the passing points so as to pass through the less congested movement route. The route planning unit 115 sets one or more passing points to the destination, whereby the mobile robot 20 can move along a movement route that is not congested. For example, when a passage is divided at a branch point or an intersection, the route planning unit 115 sets a passing point at the branch point, the intersection, the corner, and the surroundings as appropriate. Thereby, the transport efficiency can be improved.

The route planning unit 115 may set the passing points in consideration of the congestion status of the elevator, the moving distance, and the like. Further, the host management device 10 may estimate the number of the mobile robots 20 and the number of people at the estimated time when the mobile robot 20 passes through a certain location. Then, the route planning unit 115 may set the passing points in accordance with the estimated congestion status. Further, the route planning unit 115 may dynamically change the passing points in accordance with a change in the congestion status. The route planning unit 115 sets the passing points in order for the mobile robot 20 to which the transport task is assigned. The passing points may include the transport source and the transport destination. As will be described later, the mobile robot 20 autonomously moves so as to sequentially pass through the passing points set by the route planning unit 115.

The storage unit 12 is a storage unit that stores information necessary for managing and controlling the robot. In the example of FIG. 2, the floor map 121, the robot information 123, the robot control parameter 122, the route planning information 125, and transported object information 126 are shown, but the information stored in the storage unit 12 may include other information. The arithmetic processing unit 11 performs arithmetic using the information stored in the storage unit 12 when performing various processing. Various types of information stored in the storage unit 12 can be updated to the latest information.

The floor map 121 is map information of a facility in which the mobile robot 20 moves. The floor map 121 may be created in advance, may be generated from information obtained from the mobile robot 20, or may be information obtained by adding map correction information that is generated from information obtained from the mobile robot 20, to a basic map created in advance.

Further, the floor map 121 includes information indicating the standby area of the mobile robot 20. For example, a place where the user loads the transported object or a place where the user unloads the transported object is the standby area. On the floor map 121, a nurse station, a storage, a pharmacy department, and the like are set as the standby areas. In the standby area, the transported objects are frequently transported and unloaded. Therefore, two or more mobile robots 20 stand by for loading and unloading. The user U1 loads the transported object on the mobile robot 20 stopped in the standby area. Alternatively, the user U2 unloads the transported object from the mobile robot 20 stopped in the standby area. Therefore, the standby area is a place where a plurality of robots is likely to stay at the same time. Position coordinates of the standby area are set on the floor map 121. The standby area may be set in advance by a system administrator or the like.

The robot information 123 indicates the ID, model number, specifications, and the like of the mobile robot 20 managed by the host management device 10. The robot information 123 may include position information indicating the current position of the mobile robot 20. The robot information 123 may include information on whether the mobile robot 20 is executing a task or at standby. Further, the robot information 123 may include information indicating whether the mobile robot 20 is operating, out of order, or the like. Furthermore, the robot information 123 may include information on the transported object that can be transported and the transported object that cannot be transported. The robot information 123 may include information on the plane size of the mobile robot 20.

The robot control parameter 122 indicates control parameters such as a threshold distance from a peripheral object for the mobile robot 20 managed by the host management device 10. The threshold distance is a margin distance for avoiding contact with the peripheral objects including a person. Further, the robot control parameter 122 may include information on the operating intensity such as the speed upper limit value of the moving speed of the mobile robot 20.

In the robot control parameter 122, a plurality of threshold distances and speed upper limit values may be set. In this case, the host management device 10 may appropriately change the threshold distance and the speed upper limit value. For example, the threshold distance and the speed upper limit value may be set stepwise. The threshold distance and the speed upper limit value that are set stepwise may be associated with each other. For example, in the high-speed mode where the speed upper limit value is high, it is difficult to stop suddenly or decelerate, so the threshold distance is increased. In the low speed mode where the speed upper limit value is low, it is easy to stop suddenly or decelerate, so the threshold distance is reduced. In this way, the threshold distance may be changed in accordance with the speed upper limit value. The arithmetic processing unit 11 may change the speed upper limit value or the like in accordance with the transported object information or environment information. The host management device 10 selects the speed upper limit value and the threshold distance from the robot control parameter in accordance with the environment and the situation. When the speed upper limit value and the threshold distance are updated, the host management device 10 transmits the updated data to the mobile robot 20.

The robot control parameter 122 may be updated depending on the situation. The robot control parameter 122 may include information indicating the availability and usage status of the storage space of a storage 291. The robot control parameter 122 may include information on a transported object that can be transported and a transported object that cannot be transported. The above-described various types of information in the robot control parameter 122 are associated with each mobile robot 20.

The route planning information 125 includes the route planning information planned by the route planning unit 115. The route planning information 125 includes, for example, information indicating a transport task. The route planning information 125 may include the ID of the mobile robot 20 to which the task is assigned, the starting point, the content of the transported object, the transport destination, the transport source, the estimated arrival time at the transport destination, the estimated arrival time at the transport source, the arrival deadline, and the like. In the route planning information 125, the various types of information described above may be associated with each transport task. The route planning information 125 may include at least a part of the transport request information input from the user U1.

Further, the route planning information 125 may include information on the passing points for each mobile robot 20 and each transport task. For example, the route planning information 125 includes information indicating the passing order of the passing points for each mobile robot 20. The route planning information 125 may include the coordinates of each passing point on the floor map 121 and information on whether the mobile robot 20 has passed the passing points.

The transported object information 126 is information on the transported object for which the transport request has been made. For example, the transported object information 126 includes information such as the content (type) of the transported object, the transport source, and the transport destination. The transported object information 126 may include the ID of the mobile robot 20 in charge of the transport. Further, the transported object information 126 may include information indicating the status such as transport under way, pre-transport (before loading), and post-transport. These types of information in the transported object information 126 are associated with each transported object. The transported object information 126 will be described later.

The route planning unit 115 refers to various types of information stored in the storage unit 12 to formulate a route plan. For example, the route planning unit 115 determines the mobile robot 20 that executes the task, based on the floor map 121, the robot information 123, the robot control parameter 122, and the route planning information 125. Then, the route planning unit 115 refers to the floor map 121 and the like to set the passing points to the transport destination and the passing order thereof. Candidates for the passing points are registered in the floor map 121 in advance. The route planning unit 115 sets the passing points in accordance with the congestion status and the like. In the case of continuous processing of tasks, the route planning unit 115 may set the transport source and the transport destination as the passing points.

Two or more mobile robots 20 may be assigned to one transport task. For example, when the transported object is larger than the transportable capacity of the mobile robot 20, one transported object is divided into two and loaded on the two mobile robots 20. Alternatively, when the transported object is heavier than the transportable weight of the mobile robot 20, one transported object is divided into two and loaded on the two mobile robots 20. In this way, one transport task can be shared and executed by two or more mobile robots 20. It goes without saying that, when the mobile robots 20 of different sizes are controlled, route planning may be performed such that the mobile robot 20 capable of transporting the transported object receives the transported object.

Further, one mobile robot 20 may perform two or more transport tasks in parallel. For example, one mobile robot 20 may simultaneously load two or more transported objects and sequentially transport the transported objects to different transport destinations. Alternatively, while one mobile robot 20 is transporting one transported object, another transported object may be loaded on the mobile robot 20. The transport destinations of the transported objects loaded at different locations may be the same or different. With this configuration, the tasks can be executed efficiently.

In such a case, storage information indicating the usage status or the availability of the storage space of the mobile robot 20 may be updated. That is, the host management device 10 may manage the storage information indicating the availability and control the mobile robot 20. For example, the storage information is updated when the transported object is loaded or received. When the transport task is input, the host management device 10 refers to the storage information and directs the mobile robot 20 having room for loading the transported object to receive the transported object. With this configuration, one mobile robot 20 can execute a plurality of transport tasks at the same time, and two or more mobile robots 20 can share and execute the transport tasks. For example, a sensor may be installed in the storage space of the mobile robot 20 to detect the availability. Further, the capacity and weight of each transported object may be registered in advance.

The buffer memory 13 is a memory that stores intermediate information generated in the processing of the arithmetic processing unit 11. The communication unit 14 is a communication interface for communicating with the plurality of environmental cameras 300 and at least one mobile robot 20 provided in the facility where the system 1 is used. The communication unit 14 can perform both wired communication and wireless communication. For example, the communication unit 14 transmits a control signal necessary for controlling the mobile robot 20 to each mobile robot 20. The communication unit 14 receives the information collected by the mobile robot 20 and the environmental cameras 300.

The mobile robot 20 includes an arithmetic processing unit 21, a storage unit 22, a communication unit 23, a proximity sensor (for example, a distance sensor group 24), a camera 25, a drive unit 26, a display unit 27, and an operation reception unit 28. Although FIG. 2 shows only typical processing blocks provided in the mobile robot 20, the mobile robot 20 also includes many other processing blocks that are not shown.

The communication unit 23 is a communication interface for communicating with the communication unit 14 of the host management device 10. The communication unit 23 communicates with the communication unit 14 using, for example, a wireless signal. The distance sensor group 24 is, for example, a proximity sensor, and outputs proximity object distance information indicating a distance from an object or a person that is present around the mobile robot 20. The camera 25, for example, captures an image for grasping the surrounding situation of the mobile robot 20. The camera 25 can also capture an image of a position marker provided on the ceiling or the like of the facility, for example. The mobile robot 20 may be made to grasp the position of the mobile robot 20 itself using this position marker.

The drive unit 26 drives drive wheels provided on the mobile robot 20. The drive unit 26 may include an encoder or the like that detects the number of rotations of the drive wheels and the drive motor thereof. The position of the mobile robot 20 (current position) may be estimated based on the output of the encoder. The mobile robot 20 detects its current position and transmits the information to the host management device 10.

The display unit 27 and the operation reception unit 28 are realized by a touch panel display. The display unit 27 displays a user interface screen that serves as the operation reception unit 28. Further, the display unit 27 may display information indicating the destination of the mobile robot 20 and the state of the mobile robot 20. The operation reception unit 28 receives an operation from the user. The operation reception unit 28 includes various switches provided on the mobile robot 20 in addition to the user interface screen displayed on the display unit 27.

The arithmetic processing unit 21 performs arithmetic used for controlling the mobile robot 20. The arithmetic processing unit 21 can be implemented as a device capable of executing a program such as a CPU of a computer, for example. Various functions can also be realized by a program. The arithmetic processing unit 21 includes a movement command extraction unit 211 and a drive control unit 212. Although FIG. 2 shows only typical processing blocks included in the arithmetic processing unit 21, the arithmetic processing unit 21 includes processing blocks that are not shown. The arithmetic processing unit 21 may search for a route between the passing points.

The movement command extraction unit 211 extracts a movement command from the control signal given by the host management device 10. For example, the movement command includes information on the next passing point. For example, the control signal may include information on the coordinates of the passing points and the passing order of the passing points. The movement command extraction unit 211 extracts these types of information as a movement command.

Further, the movement command may include information indicating that the movement to the next passing point has become possible. When the passage width is narrow, the mobile robots 20 may not be able to pass each other. There are also cases where the passage cannot be used temporarily. In such a case, the control signal includes a command to stop the mobile robot 20 at a passing point before the location at which the mobile robot 20 should stop. After the other mobile robot 20 has passed or after movement in the passage has become possible, the host management device 10 outputs a control signal informing the mobile robot 20 that the mobile robot 20 can move in the passage. Thus, the mobile robot 20 that has been temporarily stopped resumes movement.

The drive control unit 212 controls the drive unit 26 such that the drive unit 26 moves the mobile robot 20 based on the movement command given from the movement command extraction unit 211. For example, the drive unit 26 includes drive wheels that rotate in accordance with a control command value from the drive control unit 212. The movement command extraction unit 211 extracts the movement command such that the mobile robot 20 moves toward the passing point received from the host management device 10. The drive unit 26 rotationally drives the drive wheels. The mobile robot 20 autonomously moves toward the next passing point. With this configuration, the mobile robot 20 sequentially passes the passing points so as to arrive at the transport destination. Further, the mobile robot 20 may estimate its position and transmit a signal indicating that the mobile robot 20 has passed the passing point to the host management device 10. Thus, the host management device 10 can manage the current position and the transport status of each mobile robot 20.

The storage unit 22 stores a floor map 221, a robot control parameter 222, and transported object information 226. FIG. 2 shows only a part of the information stored in the storage unit 22, and the storage unit 22 also includes information other than the floor map 221, the robot control parameter 222, and the transported object information 226 shown in FIG. 2. The floor map 221 is map information of a facility in which the mobile robot 20 moves. The floor map 221 is, for example, an item obtained by downloading the floor map 121 of the host management device 10. The floor map 221 may be created in advance. Further, the floor map 221 may not be the map information of the entire facility but may be the map information including a part of the area in which the mobile robot 20 is planned to move. The above-mentioned standby area is set on the floor map 221. That is, the floor map 221 includes information on the standby area.

The robot control parameter 222 is a parameter for operating the mobile robot 20. The robot control parameter 222 includes, for example, a threshold distance from a peripheral object. Further, the robot control parameter 222 also includes a speed upper limit value of the mobile robot 20. When the mobile robot 20 receives the robot control parameter 122 updated in the host management device 10, the data of the robot control parameter 222 is updated.

Control may be performed so that the threshold distance changes stepwise in accordance with the moving speed while the mobile robot is moving. For example, when the mobile robot 20 accelerates and starts moving at high speed, the threshold distance is increased. That is, when the speed of the mobile robot 20 exceeds the speed threshold value, the threshold distance is increased. When the mobile robot 20 is moving at high speed, the braking distance becomes large, so it is preferable to increase the threshold distance, which is a margin distance. Therefore, the threshold distance may be changed depending on whether the mobile robot 20 moves in the low speed mode at a speed below the speed threshold value or in the high speed mode at a speed equal to or larger than the speed threshold value. It goes without saying that the threshold distance may be divided into three or more stages. For example, different threshold distances may be set upon setting three stages of high-speed mode, medium-speed mode, and low-speed mode. The higher the speed, the larger the threshold distance. That is, the threshold distance is the smallest in the lowest speed mode.

Similar to the transported object information 126, the transported object information 226 includes information on the transported object. The transported object information 226 includes information such as the content (type) of the transported object, the transport source, and the transport destination. The transported object information 226 may include information indicating the status such as transport under way, pre-transport (before loading), and post-transport. These types of information in the transported object information 226 are associated with each transported object. The transported object information 226 will be described later. The transported object information 226 only needs to include information on the transported object transported by the mobile robot 20. Therefore, the transported object information 226 is a part of the transported object information 126. That is, the transported object information 226 does not have to include the information on the transport performed by other mobile robots 20.

The drive control unit 212 refers to the robot control parameter 222 and stops the operation or decelerates in response to the fact that the distance indicated by the distance information obtained from the distance sensor group 24 has fallen below the threshold distance. The drive control unit 212 controls the drive unit 26 such that the mobile robot 20 travels at a speed equal to or lower than the speed upper limit value. The drive control unit 212 limits the rotation speed of the drive wheels so that the mobile robot 20 does not move at a speed equal to or higher than the speed upper limit value.

Configuration of Mobile Robot 20

Figure 3:
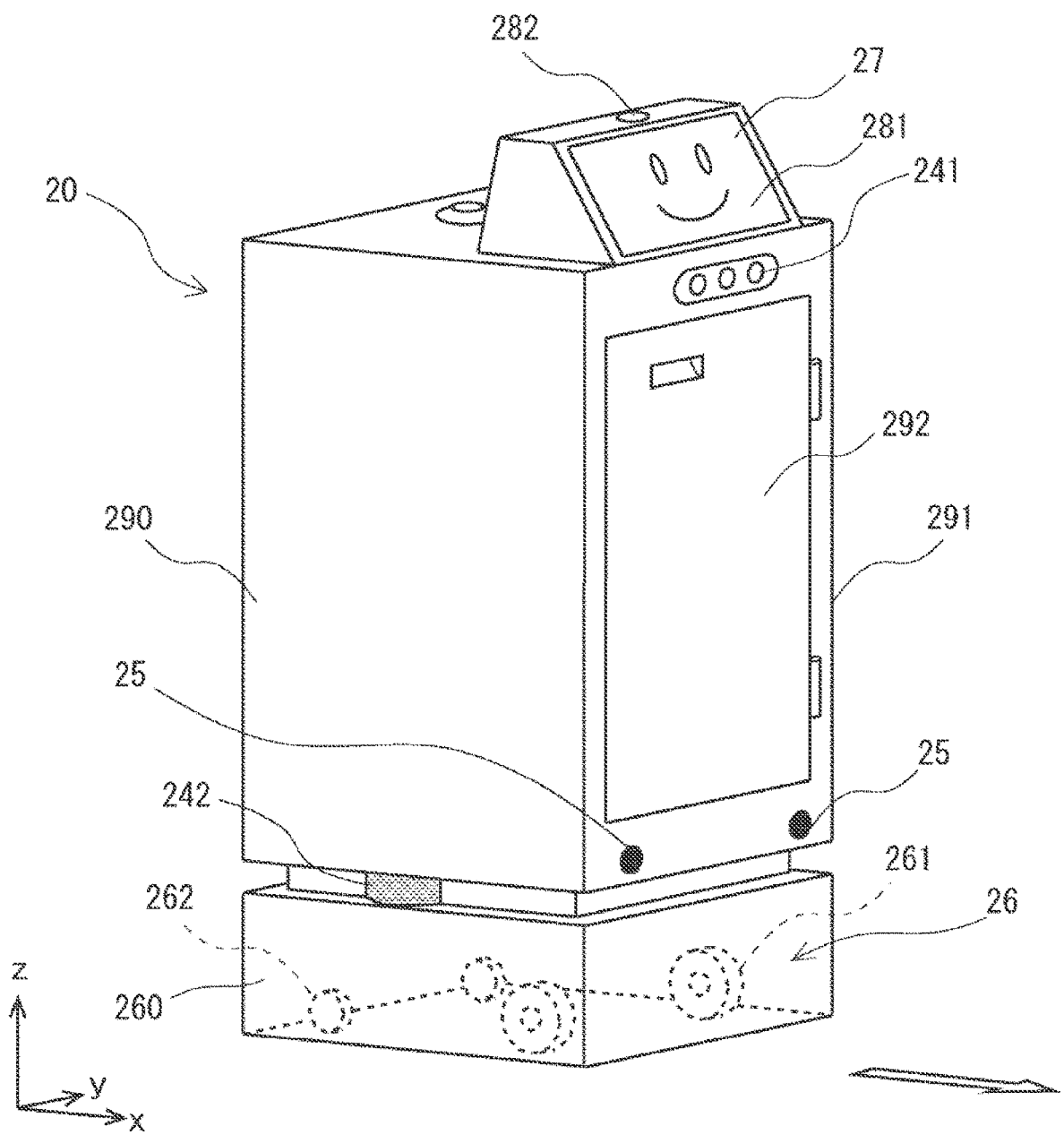
FIG. 3 is a schematic view showing an example of the mobile robot.

Here, the appearance of the mobile robot 20 will be described. FIG. 3 shows a schematic view of the mobile robot 20. The mobile robot 20 shown in FIG. 3 is one of the modes of the mobile robot 20, and may be in another form. In FIG. 3, the x direction is the forward and backward directions of the mobile robot 20, they direction is the right-left direction of the mobile robot 20, and the z direction is the height direction of the mobile robot 20.

The mobile robot 20 includes a main body portion 290 and a carriage portion 260. The main body portion 290 is installed on the carriage portion 260. The main body portion 290 and the carriage portion 260 each have a rectangular parallelepiped housing, and each component is installed inside the housing. For example, the drive unit 26 is housed inside the carriage portion 260.

The main body portion 290 is provided with the storage 291 that serves as a storage space and a door 292 that seals the storage 291. The storage 291 is provided with a plurality of shelves, and the availability is managed for each shelf. For example, by providing various sensors such as a weight sensor in each shelf, the availability can be updated. The mobile robot 20 moves autonomously to transport the transported object stored in the storage 291 to the destination instructed by the host management device 10. The main body portion 290 may include a control box or the like (not shown) in the housing. Further, the door 292 may be able to be locked with an electronic key or the like. Upon arriving at the transport destination, the user U2 unlocks the door 292 with the electronic key. Alternatively, the door 292 may be automatically unlocked when the mobile robot 20 arrives at the transport destination.

As shown in FIG. 3, front-rear distance sensors 241 and right-left distance sensors 242 are provided as the distance sensor group 24 on the exterior of the mobile robot 20. The mobile robot 20 measures the distance of the peripheral objects in the front-rear direction of the mobile robot 20 by the front-rear distance sensors 241. The mobile robot 20 measures the distance of the peripheral objects in the right-left direction of the mobile robot 20 by the right-left distance sensors 242.

For example, the front-rear distance sensor 241 is provided on the front surface and the rear surface of the housing of the main body portion 290. The right-left distance sensor 242 is provided on the left side surface and the right side surface of the housing of the main body portion 290. The front-rear distance sensors 241 and the right-left distance sensors 242 are, for example, ultrasonic distance sensors and laser rangefinders. The front-rear distance sensors 241 and the right-left distance sensors 242 detect the distance from the peripheral objects. When the distance from the peripheral object detected by the front-rear distance sensor 241 or the right-left distance sensor 242 becomes equal to or less than the threshold distance, the mobile robot 20 decelerates or stops.

The drive unit 26 is provided with drive wheels 261 and casters 262. The drive wheels 261 are wheels for moving the mobile robot 20 frontward, rearward, rightward, and leftward. The casters 262 are driven wheels that roll following the drive wheels 261 without being given a driving force. The drive unit 26 includes a drive motor (not shown) and drives the drive wheels 261.

For example, the drive unit 26 supports, in the housing, two drive wheels 261 and two casters 262, each of which are in contact with the traveling surface. The two drive wheels 261 are arranged such that their rotation axes coincide with each other. Each drive wheel 261 is independently rotationally driven by a motor (not shown). The drive wheels 261 rotate in accordance with a control command value from the drive control unit 212 in FIG. 2. The casters 262 are driven wheels that are provided such that a pivot axis extending in the vertical direction from the drive unit 26 pivotally supports the driven wheels at a position away from the rotation axis of the driven wheels, and thus follow the movement direction of the drive unit 26.

For example, when the two drive wheels 261 are rotated in the same direction at the same rotation speed, the mobile robot 20 travels straight, and when the two drive wheels 261 are rotated at the same rotation speed in the opposite directions, the mobile robot 20 pivots around the vertical axis extending through approximately the center of the two drive wheels 261. Further, by rotating the two drive wheels 261 in the same direction and at different rotation speeds, the mobile robot 20 can proceed while turning right and left. For example, by making the rotation speed of the left drive wheel 261 higher than the rotation speed of the right drive wheel 261, the mobile robot 20 can make a right turn. In contrast, by making the rotation speed of the right drive wheel 261 higher than the rotation speed of the left drive wheel 261, the mobile robot 20 can make a left turn. That is, the mobile robot 20 can travel straight, pivot, turn right and left, etc. in any direction by controlling the rotation direction and the rotation speed of each of the two drive wheels 261.

Further, in the mobile robot 20, the display unit 27 and an operation interface 281 are provided on the upper surface of the main body portion 290. The operation interface 281 is displayed on the display unit 27. When the user touches and operates the operation interface 281 displayed on the display unit 27, the operation reception unit 28 can receive an instruction input from the user. An emergency stop button 282 is provided on the upper surface of the display unit 27. The emergency stop button 282 and the operation interface 281 function as the operation reception unit 28.

The display unit 27 is, for example, a liquid crystal panel that displays a character's face as an illustration or presents information on the mobile robot 20 in text or with an icon. By displaying a character's face on the display unit 27, it is possible to give surrounding observers the impression that the display unit 27 is a pseudo face portion. It is also possible to use the display unit 27 or the like installed in the mobile robot 20 as the user terminal 400.

The cameras 25 are installed on the front surface of the main body portion 290. Here, the two cameras 25 function as stereo cameras. That is, the two cameras 25 having the same angle of view are provided so as to be horizontally separated from each other. An image captured by each camera 25 is output as image data. It is possible to calculate the distance from the subject and the size of the subject based on the image data of the two cameras 25. The arithmetic processing unit 21 can detect a person, an obstacle, or the like at positions forward in the movement direction by analyzing the images of the cameras 25. When there are people or obstacles at positions forward in the traveling direction, the mobile robot 20 moves along the route while avoiding the people or the obstacles. The image data of the cameras 25 is transmitted to the host management device 10.

Figure 4:
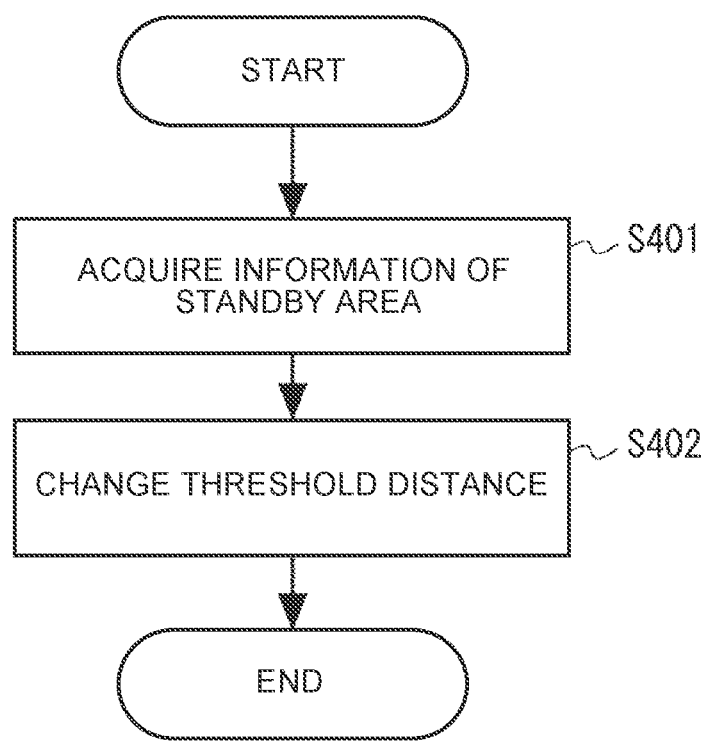
FIG. 4 is a flowchart showing a control method according to the present embodiment.

The mobile robot 20 recognizes the peripheral objects and identifies the position of the mobile robot 20 itself by analyzing the image data output by the cameras 25 and the detection signals output by the front-rear distance sensors 241 and the right-left distance sensors 242. The cameras 25 capture images of the front of the mobile robot 20 in the traveling direction. As shown in FIG. 4, the mobile robot 20 considers the side on which the cameras 25 are installed as the front of the mobile robot 20. That is, during normal movement, the traveling direction is the forward direction of the mobile robot 20 as shown by the arrow.

Control Method

Figure 5:
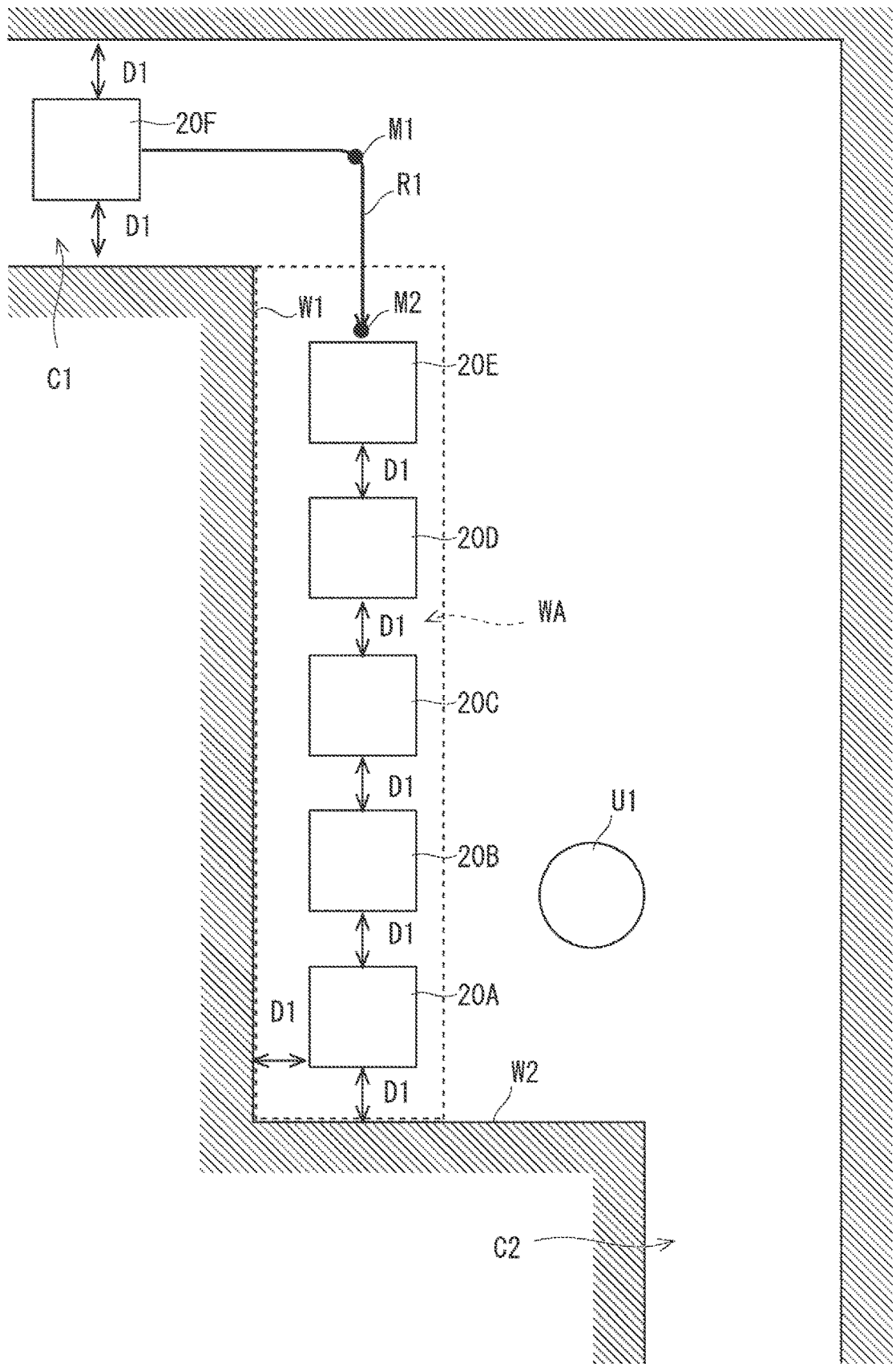
FIG. 5 is a schematic diagram illustrating a control operation of a first embodiment.
Figure 6:
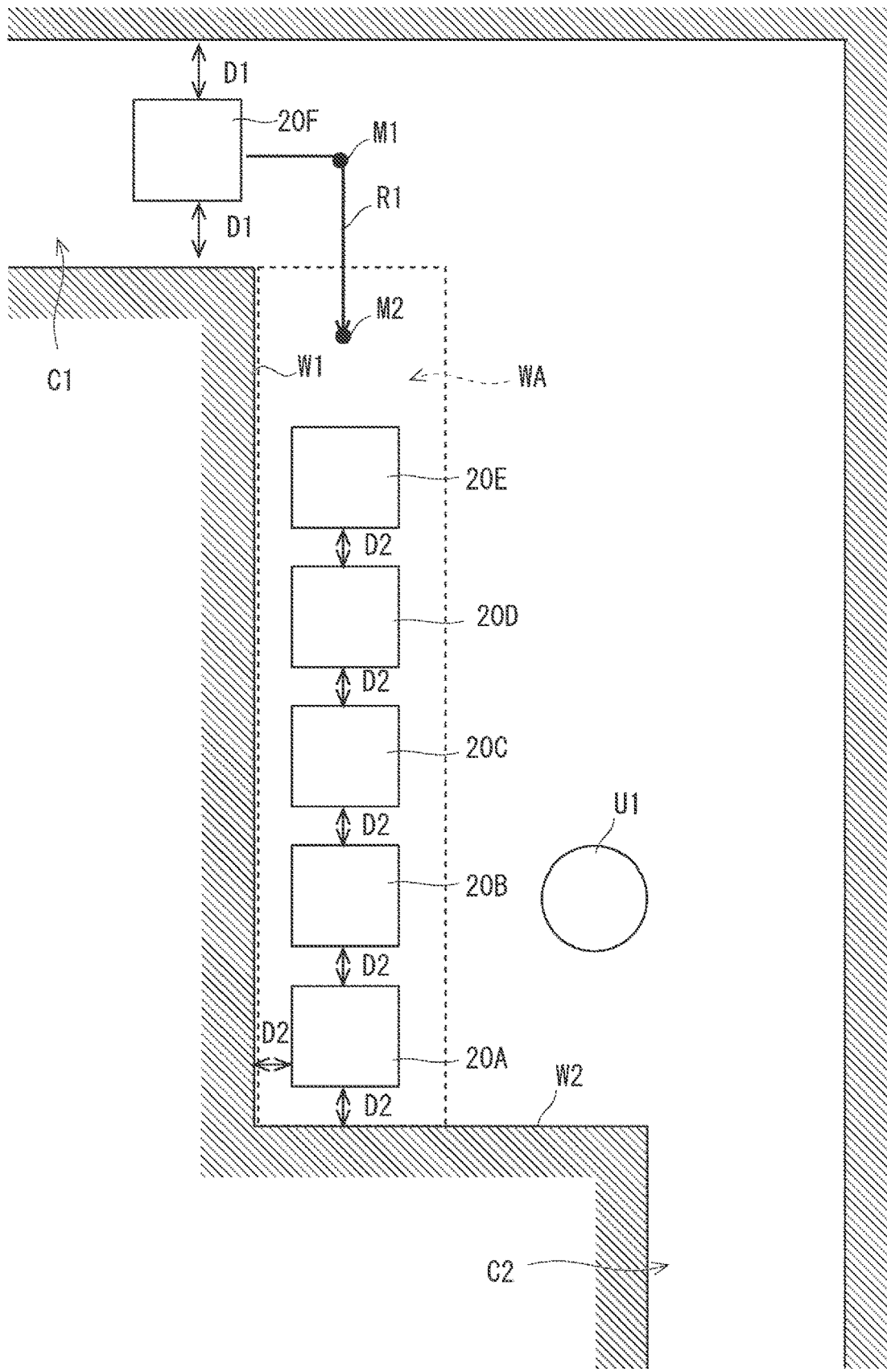
FIG. 6 is a schematic diagram illustrating the control operation of the first embodiment.
Figure 7:
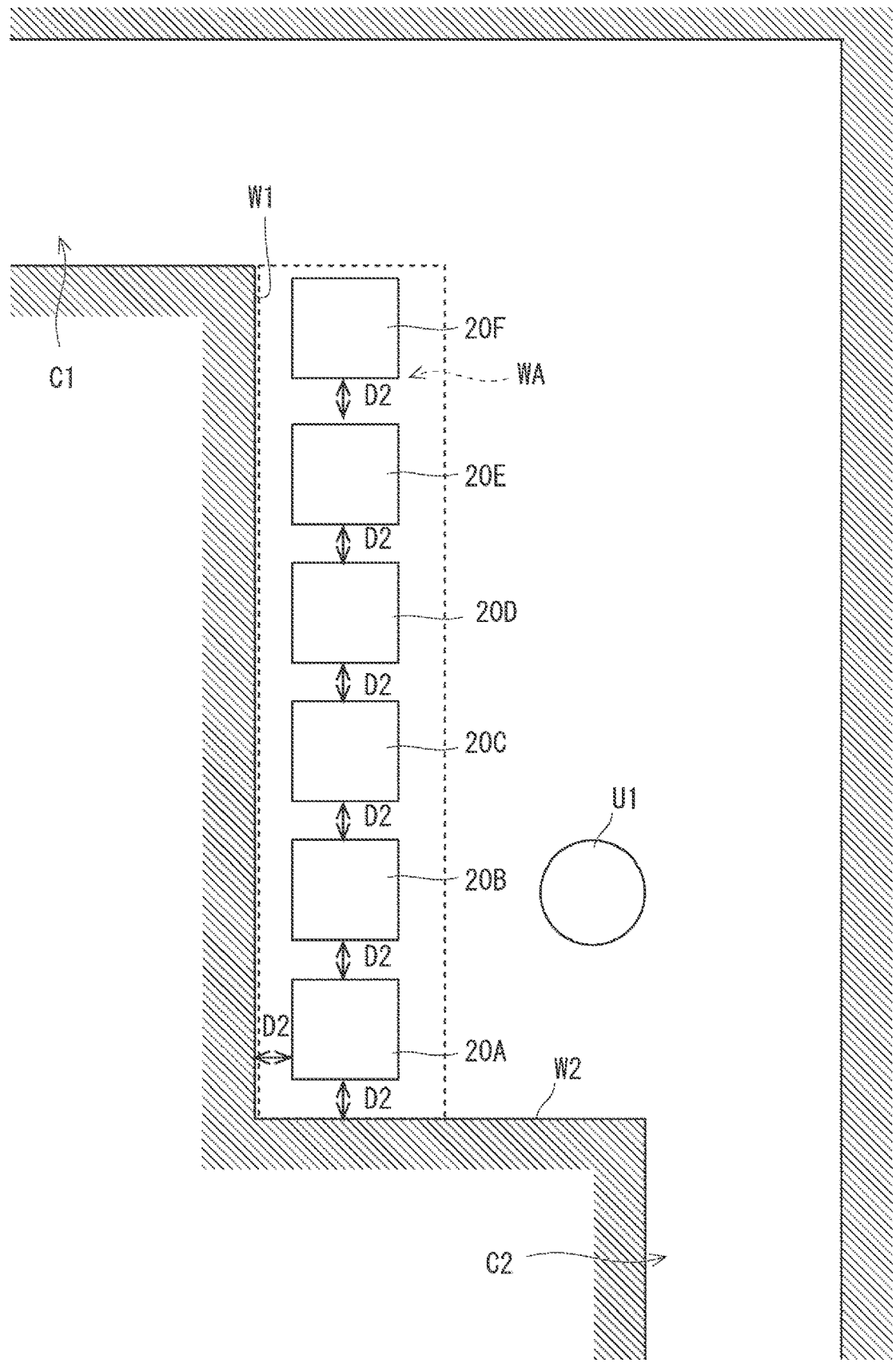
FIG. 7 is a schematic diagram illustrating the control operation of the first embodiment.

In the present embodiment, the host management device 10 changes the threshold distance of the mobile robot 20 in accordance with the number of the mobile robots 20 standing by in the standby area. The control operation in the standby area will be described with reference to FIGS. 4 to 7. FIG. 4 is a flowchart showing a control method in the present system. FIGS. 5 to 7 are schematic diagrams illustrating the control method, and are plan views showing a state in which the mobile robots 20 are standing by in the standby area WA. In FIGS. 5 to 7, a plurality of the mobile robots 20 is identified as mobile robots 20A to 20F. That is, in FIGS. 5 to 7, six mobile robots 20A to 20F are shown.

First, the arithmetic processing unit 11 acquires the information of the standby area WA (S401). Here, the arithmetic processing unit 11 acquires the position coordinates of the standby area WA set in the floor map 121 and the like. Further, the host management device 10 acquires the current position of the mobile robot 20 that moves in the facility. Thus, the host management device 10 can detect the number of the mobile robots 20 standing by in the standby area WA. Here, a part along the wall of the nurse station or the like serves as the standby area WA. The standby area WA is a rectangular area, and two sides thereof are defined by a wall W1 and a wall W2.

In FIG. 5, five mobile robots 20A to 20E are stopped in the standby area WA. Specifically, as shown in FIG. 5, five mobile robots 20A to 20E are lined up in a row along the left wall W1. The user U1 loads the transported objects on the mobile robots 20A to 20E standing by in the standby area WA. Alternatively, the user U1 unloads the transported objects stored in the mobile robots 20A to 20E standing by in the standby area WA. That is, further, the mobile robots 20A to 20E are standing by for loading or unloading of the transported objects. The mobile robot 20F is moving in a passage C1 toward the standby area WA. Specifically, the mobile robot 20F is moving along a route R1 in the order of passing points M1 and M2.

As shown in FIG. 5, the threshold distance of the mobile robots 20A to 20F is a first threshold distance D1. That is, in the standby area WA, the distances between each of the mobile robots 20A to 20E and the wall W1 or the adjacent mobile robot are the first threshold distances D1. For example, for the mobile robot 20A, the distance from the wall W1, the distance from the wall W2, and the distance from the mobile robot 20B are the first threshold distances D1. Further, the mobile robot 20F is moving with a distance from the wall of the passage C1 by the first threshold distance D1 or more.

When the mobile robot 20F arrives at the standby area WA, the mobile robot 20F stands by in the standby area WA for loading of the transported object or the like. However, since the five mobile robots 20A to 20E are already stopped in the standby area WA, there is no space for the mobile robot 20F to stand by. That is, there is no space in the standby area WA where the mobile robot 20F can be stopped. When the mobile robot 20F stops in the periphery of the standby area WA, the mobile robot 20F interferes with the movement of the other mobile robots 20 and the work of the user U1.

Further, since the passage C1 has a narrow width, the mobile robot 20F cannot pass by another mobile robot 20. That is, the passage C1 is not wide enough for two mobile robots 20 to pass each other. In this case, the mobile robot 20F needs to stand by before the passage C1. For example, when a wide passing space (not shown) is provided partway through the passage C1, the mobile robot 20F stands by in the passing space until there is a vacancy in the standby area WA.

Therefore, in the present embodiment, the host management device 10 changes the threshold distance in accordance with the number of the mobile robots 20 in the standby area WA (S402). That is, in FIG. 5, since the standby area WA is fully occupied, the host management device 10 reduces the threshold distances of the mobile robots 20A to 20E. FIG. 6 shows a state in which the threshold distance is reduced. The threshold distance set for the mobile robots 20A to 20E is defined as a second threshold distance D2. The second threshold distance D2 is a value smaller than the first threshold distance D1. When the threshold distance is changed, the threshold distances of the robot control parameter 122 and the robot control parameter 222 may be rewritten. The host management device 10 reduces the threshold distance of each mobile robot 20 in accordance with the number of the mobile robots 20 in the standby area WA. That is, the detection sensitivity of the distance sensor group 24 for surrounding objects is weakened.

In FIG. 6, the distance between each of the mobile robots 20A to 20E in the standby area WA and the wall W1 or the adjacent mobile robot is the second threshold distance D2. Therefore, the mobile robots 20A to 20E approach the wall W2. In this way, it is possible to secure a space in the standby area WA for the mobile robot 20F to stand by. That is, the threshold distance is reduced in a state where the standby area WA is fully occupied. As a result, as shown in FIG. 7, the mobile robots 20A to 20F can stand by in the standby area WA.

Here, when the threshold distance is the first threshold distance D1, the number of mobile robots that can be stopped in the standby area WA is five. When the threshold distance is the second threshold distance D2, the number of mobile robots that can be stopped in the standby area WA is six. When the number of the mobile robots 20 in the standby area WA exceeds a predetermined value (the number of mobile robots that can be stopped), the host management device 10 reduces the threshold distance. When the number of the mobile robots 20 in the standby area WA falls below the predetermined value, the host management device 10 increases the threshold distance.

In this way, it is possible to perform control so that the plurality of the mobile robots 20 can move efficiently. For example, it is not necessary to cause the mobile robot 20F to stand by in the passing space before the narrow passage C1. The mobile robot 20F can be moved to the standby area WA, which is a destination or a waypoint. Therefore, the movement efficiency can be improved.

Further, the threshold distance can be increased until the number of the mobile robots 20 in the standby area WA exceeds the predetermined value (the number of mobile robots that can be stopped). As a result, the mobile robots 20 in the standby area WA can move quickly.

The relationship between the moving speed and the threshold distance will be described in detail. When the threshold distance is small, it is difficult to increase the moving speed of the mobile robot 20. The higher the speed of the mobile robot 20, the longer the braking distance. When the mobile robot 20 approaches a surrounding object at high speed, it is difficult to suddenly stop or decelerate. In order to move the mobile robot 20 at high speed, it is required to take a large threshold distance, which is a margin distance. That is, by increasing the threshold distance, the mobile robot 20 can move at high speed.

According to the present embodiment, the threshold distance can be kept large until the number of mobile robots that can be stopped is exceeded. Since the mobile robot 20 can move quickly, the movement efficiency can be improved. As a result, the mobile robot 20 can move quickly from the standby area WA.

The number of mobile robots that can be stopped in the standby area WA may be preset in accordance with the area and shape of the standby area WA, the plane size of the mobile robot 20, and the threshold distance. Further, when the threshold distance is changed, the value may be set so that the number of mobile robots that can be stopped can be increased by one or more. In the example of FIG. 6, the second threshold distance D2 may be set to a value so that the number of mobile robots that can be stopped in the standby area WA is six.

Further, although the mobile robots 20A to 20F have the same plane size, the plane sizes of the mobile robots 20 may be different. For example, different types of mobile robots 20 may be used depending on the type of the transported object. In this case, the arithmetic processing unit 11 may calculate the optimum threshold distance from the plane size of the mobile robot 20 in the standby area WA each time. That is, when the arithmetic processing unit 11 detects that the number of stopped mobile robots exceeds the number of mobile robots that can be stopped, the arithmetic processing unit 11 may calculate the threshold distance. Alternatively, a plurality of threshold distances may be set for the robot control parameter 122 and the robot control parameter 222, and the arithmetic processing unit 11 may select the optimum threshold distance from the threshold distances.

When the threshold distance is changed, the host management device 10 or the mobile robot 20 may change the speed upper limit value of the robot control parameter 222. That is, the speed upper limit value may be changed in conjunction with the threshold distance. In the examples of FIGS. 5 to 7, the first speed upper limit value and the second speed upper limit value may be set in the robot control parameter 122 and the robot control parameter 222. The first speed upper limit value corresponds to the first threshold distance D1, and the second speed upper limit value corresponds to the second threshold distance D2. That is, in the robot control parameter 122 and the robot control parameter 222, the threshold distance and the speed upper limit value may constitute a set. The mobile robot 20 or the host management device 10 may select the threshold distance in accordance with the number of stopped mobile robots.

The value of the threshold distance may be determined by the host management device 10 or the mobile robot 20. That is, the host management device 10 may transmit data of the threshold distance to the mobile robot 20, and the host management device 10 may transmit a change command for the threshold distance to the mobile robot 20. When the mobile robot 20 receives the change command, the smallest value may be set from the plurality of the threshold distances set in advance for the robot control parameter 222. That is, the control for changing the threshold distance may be performed by one of the host management device 10 and the mobile robot 20, or may be performed in cooperation with the host management device 10 and the mobile robot 20.

The control may be performed so that, when the threshold distance is reduced, the other mobile robots 20B to 20E approach the mobile robot 20A on one end side of the standby area WA. That is, in the standby area WA, the mobile robot 20A moves toward the wall W2 by the amount that the threshold distance is reduced. Then, the mobile robot 20B moves so as to approach the mobile robot 20A. Further, the mobile robot 20C moves so as to approach the mobile robot 20B. The mobile robot 20D moves so as to approach the mobile robot 20C. The mobile robot 20E moves so as to approach the mobile robot 20D. In this way, a space for the mobile robot 20F to stop can be provided on the opposite side of the wall W2.

When the host management device 10 changes the threshold distance of the mobile robots 20A to 20E in the standby area WA, the host management device 10 may transmit a movement command to the mobile robots 20A to 20E. Thereby, the mobile robots 20A to 20E move so as to approach the wall W2. The host management device 10 may determine the direction in which the mobile robots 20A to 20E approach in accordance with the movement direction of the mobile robot 20F. That is, the mobile robot 20F heads toward the standby area WA from the passage C1. Therefore, in the standby area WA, the mobile robots 20A to 20E may approach the wall W2 away from the passage C1. For example, the host management device 10 can determine the approaching direction by referring to the floor map 121, the current position of the mobile robot 20F, the passing points of the route planning information 125, and the like. Alternatively, the approaching direction may be set in advance for the standby area WA.

Further, as described above, the threshold distance may be set stepwise in accordance with the moving speed. For example, when the mobile robot 20 moves in three stages of high-speed mode, medium-speed mode, and low-speed mode, the threshold distance may be set in three stages. In this case, in the standby area WA, the threshold distance for increasing the number of mobile robots that can be stopped (the second threshold distance D2 in FIG. 6) may be the threshold distance in the lowest speed mode. Further, in the standby area WA, the threshold distance for increasing the number of mobile robots that can be stopped may be a value smaller than the threshold distance in the lowest speed mode.

The size of the standby area may be fixed in advance. That is, in the robot control parameter 122 and the robot control parameter 222, the position coordinates of the standby area WA may be fixed. The standby area WA is set in a place that does not interfere with the movement of the mobile robot 20. Alternatively, the standby area WA is set in a place that does not interfere with the work or movement of the user. For example, the standby area WA is set in a wide space where two or more mobile robots 20 can pass each other. The standby area WA may also be set along the wall.

In FIG. 7, all the mobile robots 20A to 20F in the standby area WA are lined up in a row at intervals of the second threshold distance D2. Therefore, when the mobile robot 20F arrives at the standby area WA, the threshold distance of the mobile robot 20F may be changed to the first threshold distance. Alternatively, when the mobile robot 20F arrives at the standby area WA, the threshold distance of the mobile robot 20F may remain the first threshold distance.

First Modification

Figure 8:
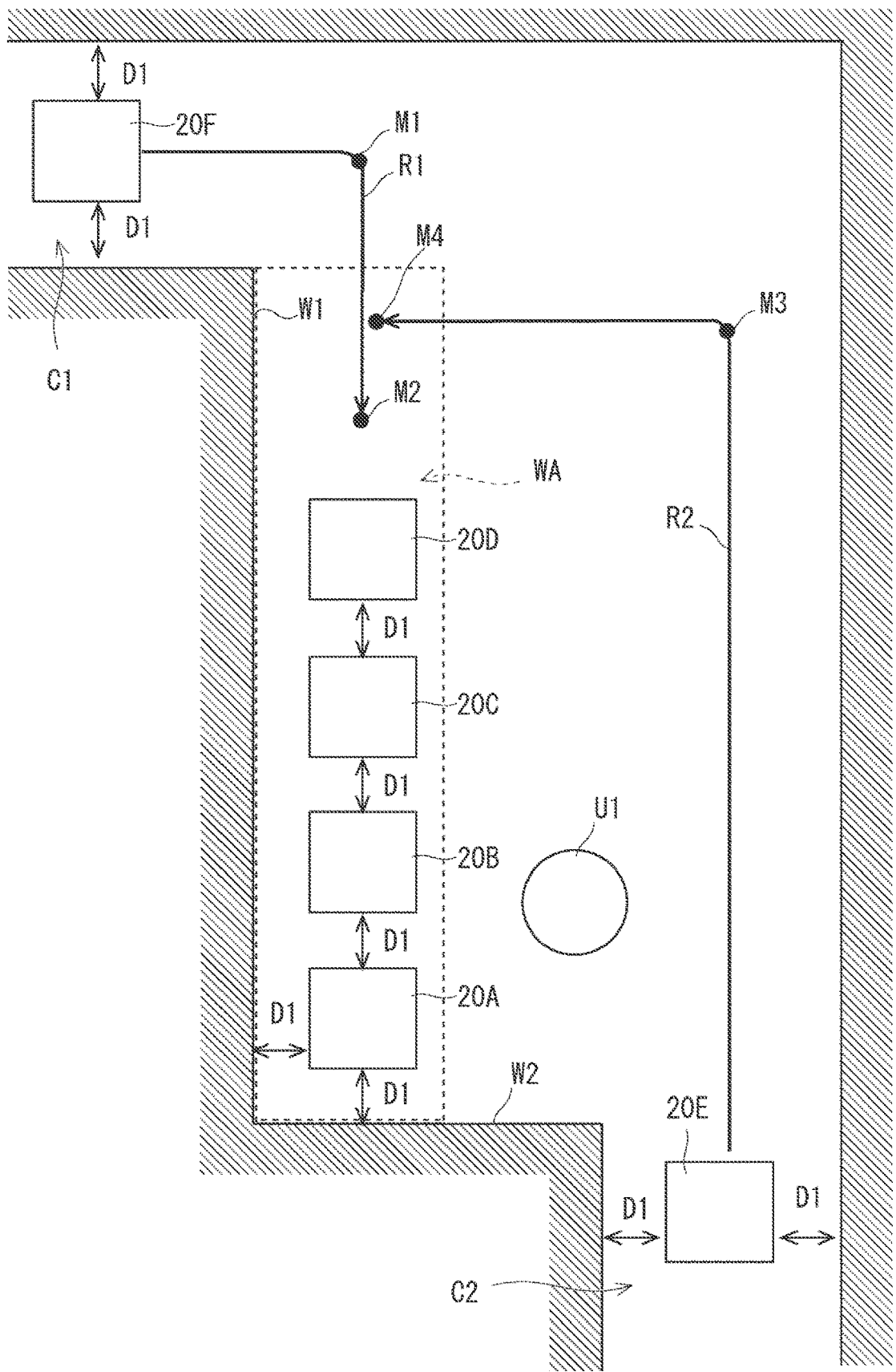
FIG. 8 is a schematic diagram illustrating a control operation of a first modification.
Figure 9:
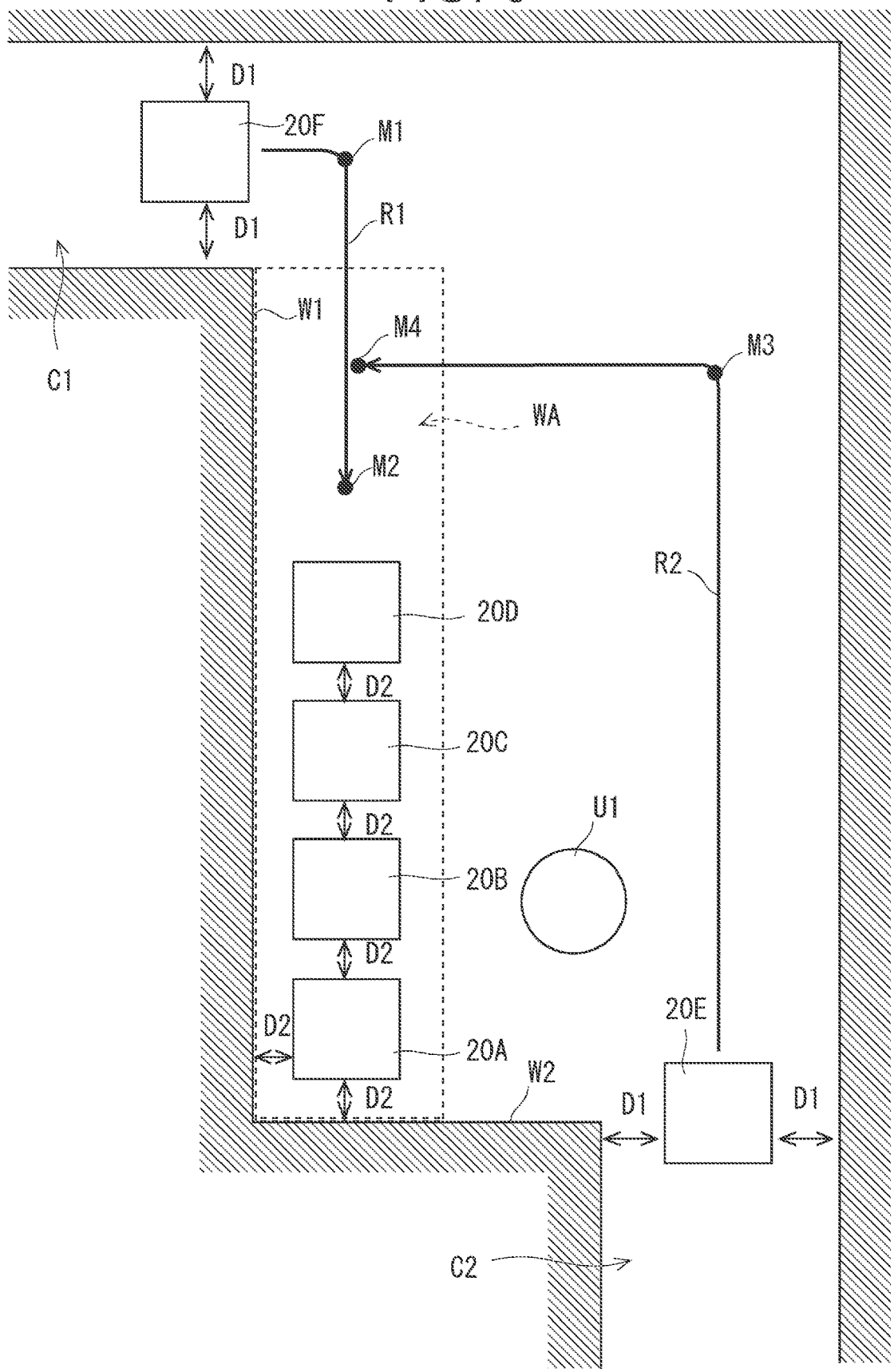
FIG. 9 is a schematic diagram illustrating the control operation of the first modification.
Figure 10:
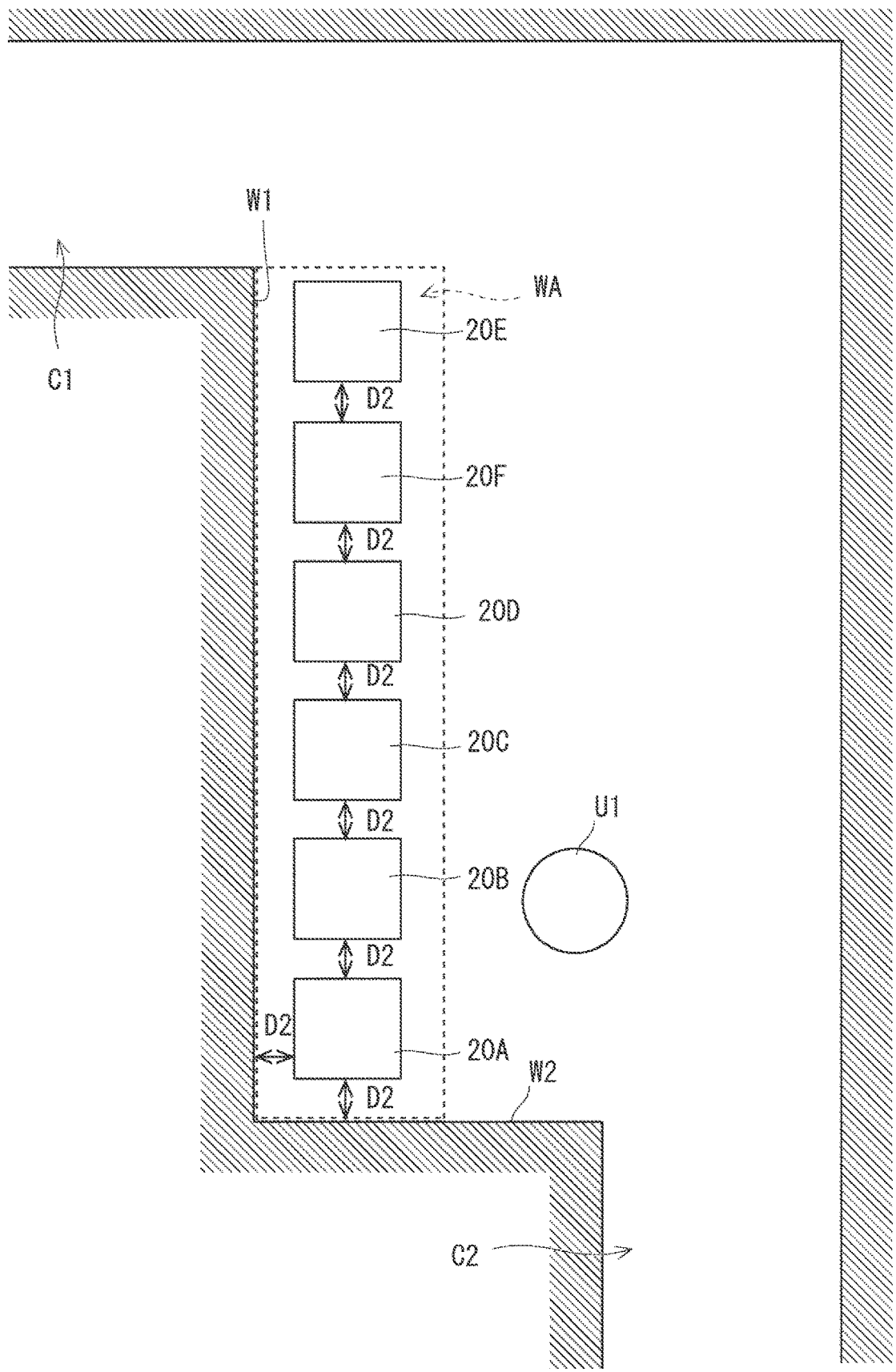
FIG. 10 is a schematic diagram illustrating the control operation of the first modification.

A first modification will be described with reference to FIGS. 8 to 10. FIGS. 8 to 10 are diagrams illustrating the control of the first modification. In the first modification, the host management device 10 reduces the threshold distance in accordance with the number of the mobile robots 20 standing by in the standby area and the expected arrival number of the mobile robots 20 moving toward the standby area WA.

For example, in FIG. 8, the mobile robots 20A to 20D are stopped in the standby area WA. The mobile robot 20E and the mobile robot 20F are moving toward the standby area WA. Similar to FIG. 6, the mobile robot 20F is moving in the passage C1 toward the standby area WA. The mobile robot 20E is moving in a passage C2 toward the standby area WA. The mobile robot 20E is moving along a route R2 in the order of passing points M3 and M4. The mobile robot 20E is moving at a distance of the first threshold distance D1 or more from the wall of the passage C2.

In FIG. 8, the threshold distance of the mobile robots 20A to 20D is the first threshold distance D1. Since the number of the mobile robots 20 standing by in the standby area WA is four, the number of mobile robots that can be stopped in the standby area WA (five) is not exceeded. However, the two mobile robots 20E and 20F are moving in the passages C1 and C2 toward the standby area WA. It is assumed that the mobile robots 20E and 20F arrive at the standby area WA at approximately the same time. Further, the mobile robots 20E and 20F are scheduled to arrive at the standby area WA before the mobile robots 20A to 20D depart from the standby area WA.

In this case, as shown in FIG. 9, the host management device 10 reduces the threshold distance of the mobile robots 20A to 20D. Since the threshold distance of the mobile robots 20A to 20D becomes the second threshold distance D2, the number of mobile robots that can be stopped in the standby area WA increases to six.

Therefore, as shown in FIG. 10, the mobile robots 20A to 20F can be stopped in the standby area WA. That is, the mobile robots 20A to 20D can approach the wall W2 before the mobile robots 20E and 20F arrive at the standby area WA. This makes it possible to quickly secure a stop space. Therefore, the movement efficiency can be further improved.

In this way, the host management device 10 reduces the threshold distance in accordance with the number of the mobile robots 20 standing by in the standby area and the expected arrival number of the mobile robots 20 moving toward the standby area WA. For example, the host management device 10 performs control so as to reduce the threshold distance when the sum of the number of the mobile robots 20 standing by and the expected arrival number of the mobile robots 20 exceeds the number of mobile robots that can be stopped. It goes without saying that the host management device 10 may count only the number of the mobile robots 20 expected to arrive within a predetermined time from the current time as the expected arrival number of the mobile robots 20. This predetermined time may be determined in consideration of the time during which the mobile robots 20A to 20D approach the wall W1 in the standby area WA, the scheduled departure time of the mobile robots 20A to 20D, and the like.

Further, at least one of the passing points M1 to M4 of the mobile robots 20E and 20F may be changed in accordance with the movement of the mobile robots 20A to 20D in the standby area WA. For example, the mobile robots 20E and 20F move with the passing points M4 and M3 as destinations and waypoints, respectively. When the mobile robots 20A to 20D move, the positions of the passing points M2 to M4 to the standby area WA change. The passing points of the mobile robots 20E and 20F may be adjusted accordingly.

Second Modification

Figure 11:
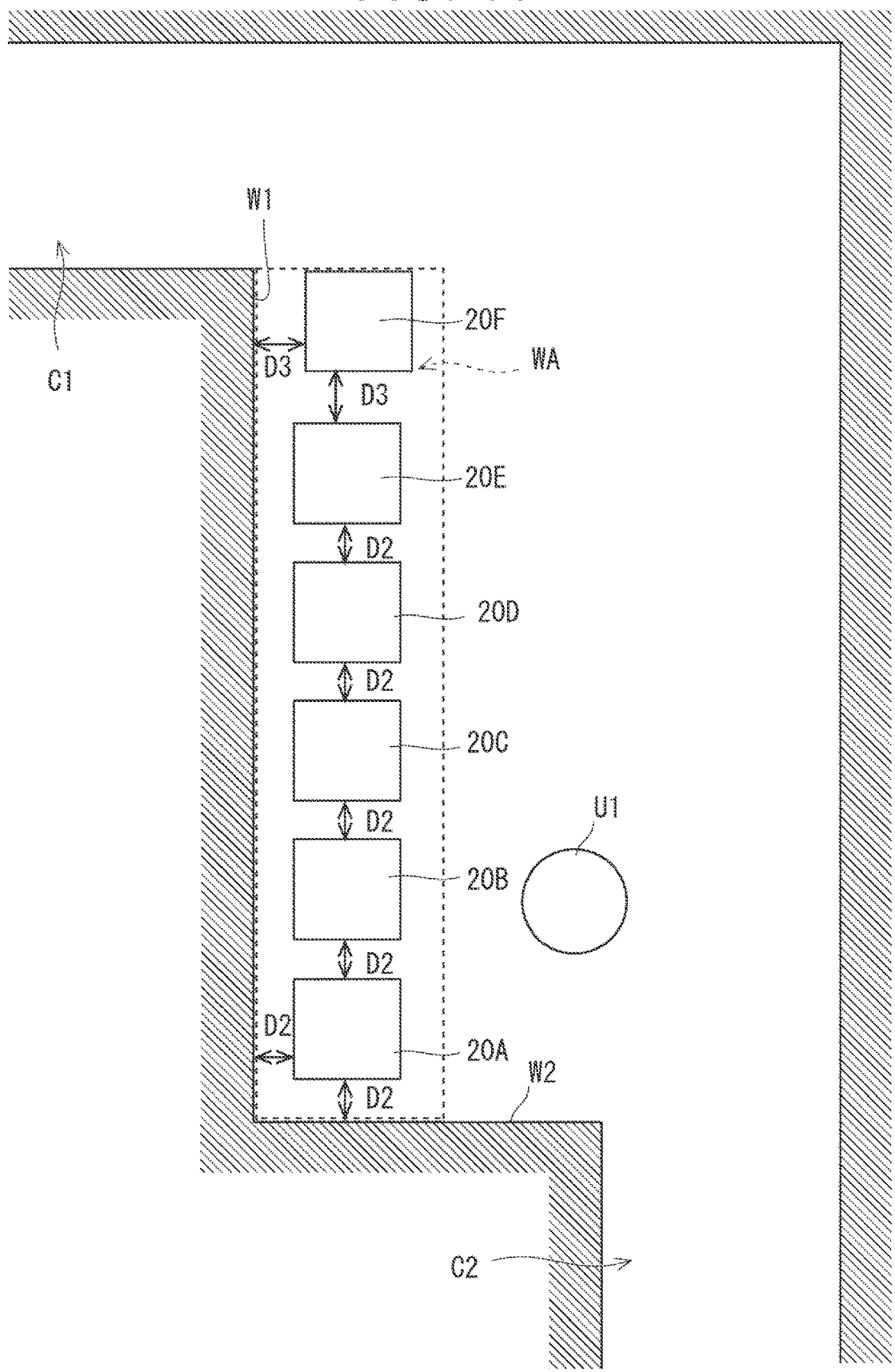
FIG. 11 is a schematic diagram illustrating a control operation of a second modification.

A second modification will be described with reference to FIG. 11. FIG. 11 is a diagram illustrating the second modification. In the second modification, the host management device 10 changes the threshold distance in accordance with the transported object information on the transported object transported by the mobile robot 20.

For example, it is assumed that the transported object information includes cleanliness information indicating the cleanliness of the transported object. For example, the transported object is classified into three levels of cleanliness: clean, unclean, and general purpose. Here, clean transported objects are, for example, a drug, blood used for blood transfusion, food, etc. that are taken in the human body, and an unused syringe, an unused injection needle, clothing, etc. that come into contact with the human body. In contrast, unclean transported objects are garbage and the like that are disposed of General-purpose transported objects are stationery, copy papers, and the like. Depending on the degree of cleanliness, flag information of a clean flag, an unclean flag, and a general-purpose flag is given to the transported object. That is, since the transported object information includes the flag information indicating the cleanliness, each transported object is associated with the clean flag, the unclean flag, or the general-purpose flag.

The host management device 10 changes the threshold distance so that the mobile robot 20 that transports the clean transported object and the mobile robot 20 that transports the unclean transported object do not come close to each other. For example, in FIG. 11, the mobile robot 20F stores an unclean transported object, and the mobile robot 20E stores a clean transported object. In this case, the threshold distance of the mobile robot 20F is set to a third threshold distance D3. The third threshold distance D3 has a value larger than that of the second threshold distance D2. The third threshold distance D3 may have the same value as the first threshold distance D1. The third threshold distance D3 may be a value larger than or smaller than the first threshold distance D1.

In this way, the host management device 10 changes the threshold distance in accordance with the transported object. For example, the host management device 10 changes the threshold distance of the mobile robot 20 in the standby area WA in accordance with the cleanliness information indicating the cleanliness of the transported object. It is possible to suppress the mobile robot 20F carrying an unclean transported object and the mobile robot 20E carrying a clean transported object from approaching less than a predetermined distance.

For example, the host management device 10 acquires the transported object information of the transported object at the time the transported object is loaded on the mobile robot 20. Since the transported object information includes the cleanliness information, a clean flag, an unclean flag, or a general-purpose flag is associated with each mobile robot 20. Alternatively, the cleanliness of the transported object to be transported may be assigned to the mobile robot 20. For example, a mobile robot 20 dedicated to an unclean transported object may be set.

The above-described first embodiment and the first and second modifications thereof can be combined as appropriate. For example, the first modification and the second modification may be combined with each other. Further, all of the first embodiment and the first and second modifications may be combined with each other. In the above embodiment, a plurality of the mobile robots 20 is stopped so as to be lined up in a row in the standby area WA, but the arrangement of the mobile robots 20 in the standby area WA is not particularly limited. For example, in the standby area WA, a plurality of the mobile robots 20 may stand by so as to be lined up in two or more rows.

Further, a part or all of the processing in the host management device 10, the mobile robot 20, or the like described above can be realized as a computer program. Such a program can be stored using various types of non-transitory computer-readable media and supplied to a computer. The non-transitory computer-readable media include various types of tangible recording media. Examples of the non-transitory computer-readable media include magnetic recording media (e.g. flexible disks, magnetic tapes, hard disk drives), magneto-optical recording media (e.g. magneto-optical disks), compact disc read-only memory (CD-ROM), compact disc recordable (CD-R), compact disc rewritable (CD-R/W), and semiconductor memory (e.g. mask ROM, programmable ROM (PROM), erasable PROM (EPROM), flash ROM, random access memory (RAM)). The program may also be supplied to the computer by various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

The present disclosure is not limited to the above embodiment, and can be appropriately modified without departing from the spirit. For example, in the above embodiment, a system in which a transport robot autonomously moves in a hospital has been described, but the above-described system can transport a predetermined article in a hotel, a restaurant, an office building, an event venue, or a complex facility as luggage.

What is claimed is:

1. A robot control system that controls a plurality of mobile robots that autonomously move in a facility, such that a distance from a peripheral object does not fall below a threshold distance, wherein:
   the robot control system acquires information on a standby area set in map information of the facility; and
   the robot control system changes the threshold distance in accordance with the number of the mobile robots standing by in the standby area;
   wherein the robot control system reduces the threshold distance in accordance with the number of the mobile robots standing by in the standby area and the expected arrival number of the mobile robots moving toward the standby area.

2. The robot control system according to claim 1, wherein the robot control system reduces the threshold distance when the number of the mobile robots stopped in the standby area exceeds a predetermined value.

3. The robot control system according to claim 1, wherein when the threshold distance is reduced, a mobile robot approaches another mobile robot on one end side of the standby area.

4. The robot control system according to claim 1 wherein:
   the mobile robot is a transport robot that transports a transported object; and
   the robot control system changes the threshold distance in accordance with transported object information on the transported object transported by the mobile robot.

5. The robot control system according to claim 1, wherein while the mobile robot is moving, the threshold distance changes stepwise in accordance with a moving speed.

6. The robot control system according to claim 1, wherein a size of the standby area is fixed.

7. A robot control method that controls a plurality of mobile robots that autonomously move in a facility, such that a distance from a peripheral object does not fall below a threshold distance, the robot control method comprising:

acquiring information on a standby area set in map information of the facility;

changing the threshold distance in accordance with the number of the mobile robots standing by in the standby area; and reducing the threshold distance in accordance with the number of the mobile robots standing by in the standby area and the expected arrival number of the mobile robots moving toward the standby area.

8. The robot control method according to claim 7, further comprising reducing the threshold distance when the number of the mobile robots stopped in the standby area exceeds a predetermined value.

9. The robot control method according to claim 7, wherein when the threshold distance is reduced, a mobile robot approaches another mobile robot on one end side of the standby area.

10. The robot control method according to claim 7, wherein:
the mobile robot is a transport robot that transports a transported object; and
the robot control method changes the threshold distance in accordance with transported object information on the transported object transported by the mobile robot.

11. The robot control method according to claim 7, wherein while the mobile robot is moving, the threshold distance changes stepwise in accordance with a moving speed.

12. The robot control method according to claim 7, wherein a size of the standby area is fixed.

13. A non-transitory computer readable medium comprising a program that causes a computer to execute a robot control method that controls a plurality of mobile robots that autonomously move in a facility, such that a distance from a peripheral object does not fall below a threshold distance, wherein the robot control method includes:

acquiring information on a standby area set in map information of the facility;

changing the threshold distance in accordance with the number of the mobile robots standing by in the standby area; and reducing the threshold distance in accordance with the number of the mobile robots standing by in the standby area and the expected arrival number of the mobile robots moving toward the standby area.

14. The non-transitory computer readable medium comprising the program according to claim 13, wherein the program reduces the threshold distance when the number of the mobile robots stopped in the standby area exceeds a predetermined value.

15. The non-transitory computer readable medium comprising the program according to claim 13, wherein when the threshold distance is reduced, a mobile robot approaches another mobile robot on one end side of the standby area.

16. The non-transitory computer readable medium comprising the program according to claim 13, wherein:
the mobile robot is a transport robot that transports a transported object; and
the program changes the threshold distance in accordance with transported object information on the transported object transported by the mobile robot.

17. The non-transitory computer readable medium comprising the program according to claim 13, wherein while the mobile robot is moving, the threshold distance changes stepwise in accordance with a moving speed.

18. The non-transitory computer readable medium comprising the program according to claim 13, wherein a size of the standby area is fixed.

\* \* \* \* \*